United States Patent [19]

Grim et al.

[11] Patent Number: 5,119,980
[45] Date of Patent: Jun. 9, 1992

[54] SKI MOUNT WITH RATCHET-TYPE CLOSURE

[75] Inventors: Michael Grim, Berkeley; Joseph J. Settelmayer, Arcata, both of Calif.

[73] Assignee: Yakima Products, Inc., Arcata, Calif.

[21] Appl. No.: 669,808

[22] Filed: Mar. 15, 1991

[51] Int. Cl.⁵ ............................................. B60R 9/12
[52] U.S. Cl. ...................... 224/315; 224/324; 224/319; 224/323; 280/814; 292/85; 292/91; 70/18; 70/58
[58] Field of Search ............... 224/327-331, 224/316-318, 319, 309, 314, 315, 320, 321, 325, 326, 322-324, 917; 211/70.5; 292/85, 87, 91, 89; 70/18, 16, 58, 57; 280/814; 190/119-121

[56] References Cited

U.S. PATENT DOCUMENTS

| | | | |
|---|---|---|---|
| 993,954 | 5/1911 | Budlong | 292/85 |
| 2,765,016 | 10/1956 | Parsegian | 190/121 X |
| 2,840,288 | 6/1958 | Broddon | 224/324 X |
| 2,948,560 | 8/1960 | Rop | 292/85 X |
| 2,999,378 | 9/1961 | Blair | 280/814 |
| 3,242,704 | 3/1966 | Barreca | 70/58 |
| 3,719,297 | 3/1973 | Nowicki | 224/315 X |
| 3,848,785 | 11/1974 | Bott | 224/324 |
| 3,999,409 | 12/1976 | Bell | 70/58 |
| 4,694,666 | 9/1987 | Bellingham et al. | 70/16 |
| 4,728,019 | 3/1988 | Olliges | 224/329 |
| 4,735,350 | 4/1988 | Kamaya | 224/315 |
| 4,865,368 | 9/1989 | McCall et al. | 190/120 X |
| 4,867,362 | 9/1989 | Finnegan et al. | 224/319 |
| 4,930,671 | 6/1990 | Tittel | 224/319 |

FOREIGN PATENT DOCUMENTS

| | | | |
|---|---|---|---|
| 2556352 | 6/1977 | Fed. Rep. of Germany | 70/18 |
| 2633569 | 1/1990 | France | 224/315 |

OTHER PUBLICATIONS

Locking Ski Mount literature by Yakima Products, 1 page, Jan. 1989.
The New Yakima Over-Center Wheel Strap literature by Yakima Products, 1 page, Jan. 1989.

Primary Examiner—Henry J. Recla
Assistant Examiner—Casey Jacyna
Attorney, Agent, or Firm—Townsend and Townsend

[57] ABSTRACT

A closure for the two hinged bars of a vehicle roof-mounted ski mount is formed from a rotatable catch or pawl secured to one of the bars and a toothed harpoon extending from the other. Engagement and disengagement of the pawl with the teeth on the harpoon is governed by a manually operated button, the pawl being spring-biased toward engagement with the harpoon. In preferred embodiments of the invention, the pawl and button are part of a removable insert which fits into an end cap on the upper bar of the ski mount, and the spring is a spring clip which holds the insert in place in the end cap while permitting it to rotate to engage or disengage the pawl with the harpoon which is on the lower bar, the spring clip also urging the pawl into engagement with the harpoon as well as immobilizing the harpoon once it has been engaged by the pawl.

6 Claims, 4 Drawing Sheets

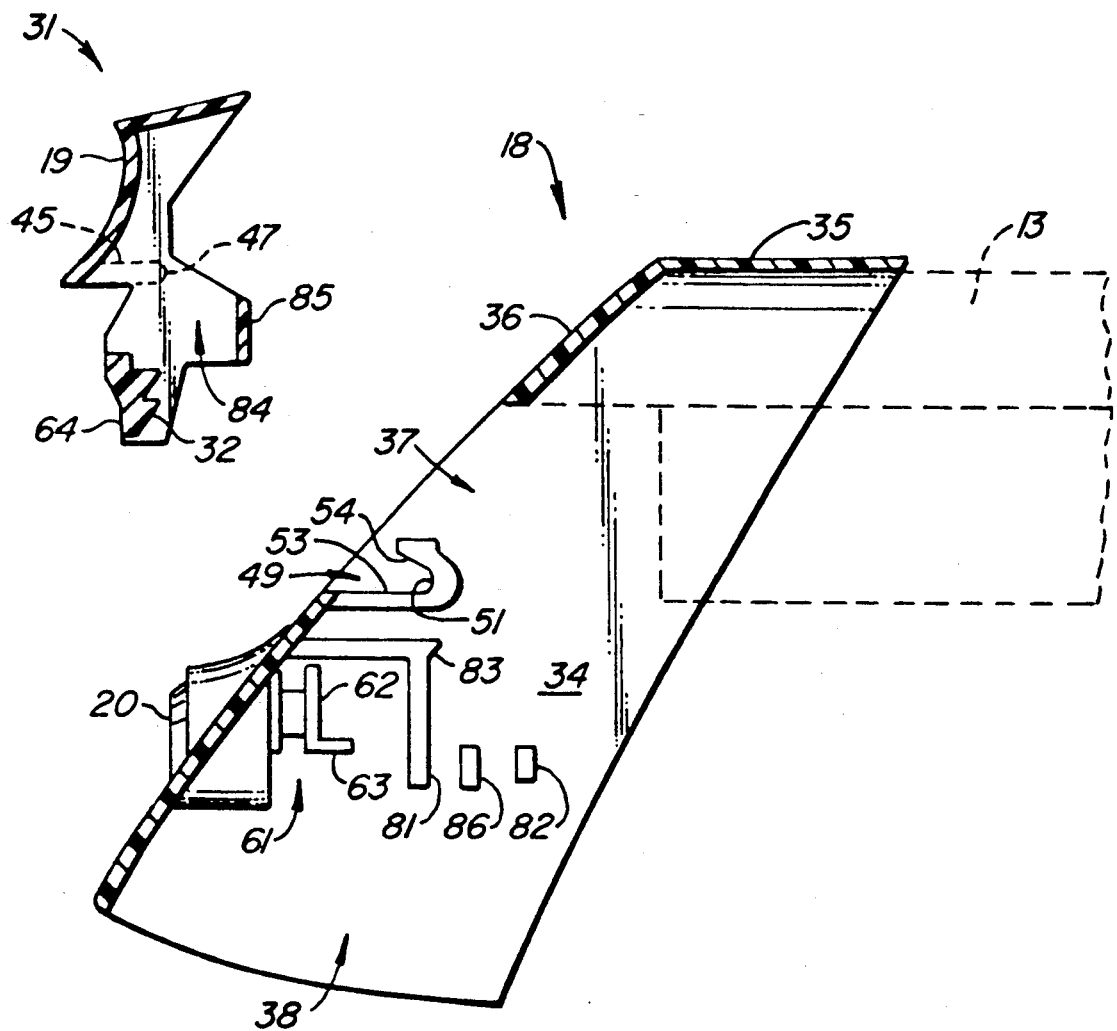
FIG. 2.
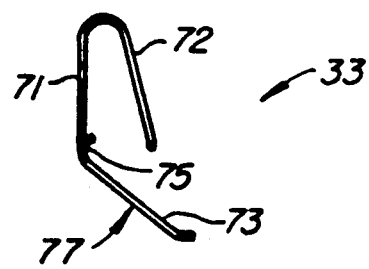

SKI MOUNT WITH RATCHET-TYPE CLOSURE

This invention lies in the field of spring-mounted latch closures, and in particular to closures for securing hinged bars together to hold such devices as skis on a vehicle-mounted roof rack.

BACKGROUND AND SUMMARY OF THE INVENTION

The fastening of flat items such as skis to the roof of an automobile requires a fastener or mount which can be tightened sufficiently to prevent the skis from slipping. When a ski mount is used to hold several skis side by side, or to hold different skis varying in thickness, tightening is particularly critical and difficult to achieve. Existing ski mounts suffer the further disadvantage of latches which require the upper half of the mount to be pressed down further than its final position in order to engage the latch. Disengagement and opening of the mount is also a problem when the upper half must be pressed down again before the latch can be released. This often requires two hands and considerable force, as well as the manipulation of small latch parts which is difficult in cold surroundings, particularly when the user is wearing gloves.

The present invention resides in a ski mount closure which is readily closed with one hand by merely lowering the upper half into position, and readily opened with one hand by merely pushing a button, and which permits tightening over a range of ski thicknesses. The closure operates by simple insertion of a harpoon to variable depths into a catch, the harpoon being readily releasable from the catch at any depth of insertion by manual pressure on the button. The closure further involves an unusually efficient arrangement of parts whereby no pivoting bolts or retaining screws are required, and a single spring clip serves several functions, including holding the catch in place in the ski mount, forcing the catch into a closed or locked position until manually released by pressure on the button, and guiding the travel of the harpoon.

In accordance with the invention, the upper or movable bar (or "top wing") of the ski mount terminates in an end cap, and an insert fits into an opening in the end cap, the insert containing both the release button which protrudes through the end cap opening and a pawl which extends into the end cap interior and forms part of the catch mechanism. The insert and end cap are joined through mated fixtures on the surfaces of each. These fixtures are protrusions and/or indentations which position the insert in the end cap in a manner which permits the insert to be rotated, thereby bringing the pawl into and out of engagement with the harpoon. The harpoon is a post extending upward from the lower or stationary bar (or "bottom wing") of the mount, with a row of teeth on one side. As the upper bar of the mount is pressed down over the lower bar, the harpoon enters the end cap through an opening in the lower side of the end cap, and the pawl in the end cap interior travels down over the teeth of the harpoon, engaging the teeth in the manner of a ratchet. By pressing further downward on the upper bar, the user forces the pawl further down the harpoon to engage teeth at lower positions on the harpoon, releasable only by rotation of the pawl away from the harpoon.

The spring clip engages all three elements—the end cap, the insert and the harpoon—and serves three functions simultaneously: (1) it holds the mated fixtures on the insert and end cap together; (2) it controls the rotation of the insert in the end cap, thereby urging or biasing the pawl toward a position at which it will engage the teeth on the harpoon when the bars of the mount are closed; and (3) it supports or immobilizes the harpoon to strengthen the engagement of the harpoon teeth with the pawl.

Further features and advantages of the invention will be apparent from the description which follows.

BRIEF DESCRIPTION OF THE DRAWINGS

FIG. 2 is a side view of an end cap, an insert containing a button and a pawl, and a spring clip, all forming part of the catch mechanism of the ski mount of FIG. 1, shown disassembled and with the end cap and insert in cross section.

DETAILED DESCRIPTION OF THE INVENTION AND PREFERRED EMBODIMENTS

The structural features and operation of the present invention are best understood by a description of a single specific example of the implementation of the invention. One such example or embodiment of the invention is depicted in the Figures and will be described in detail below.

Figure 1:
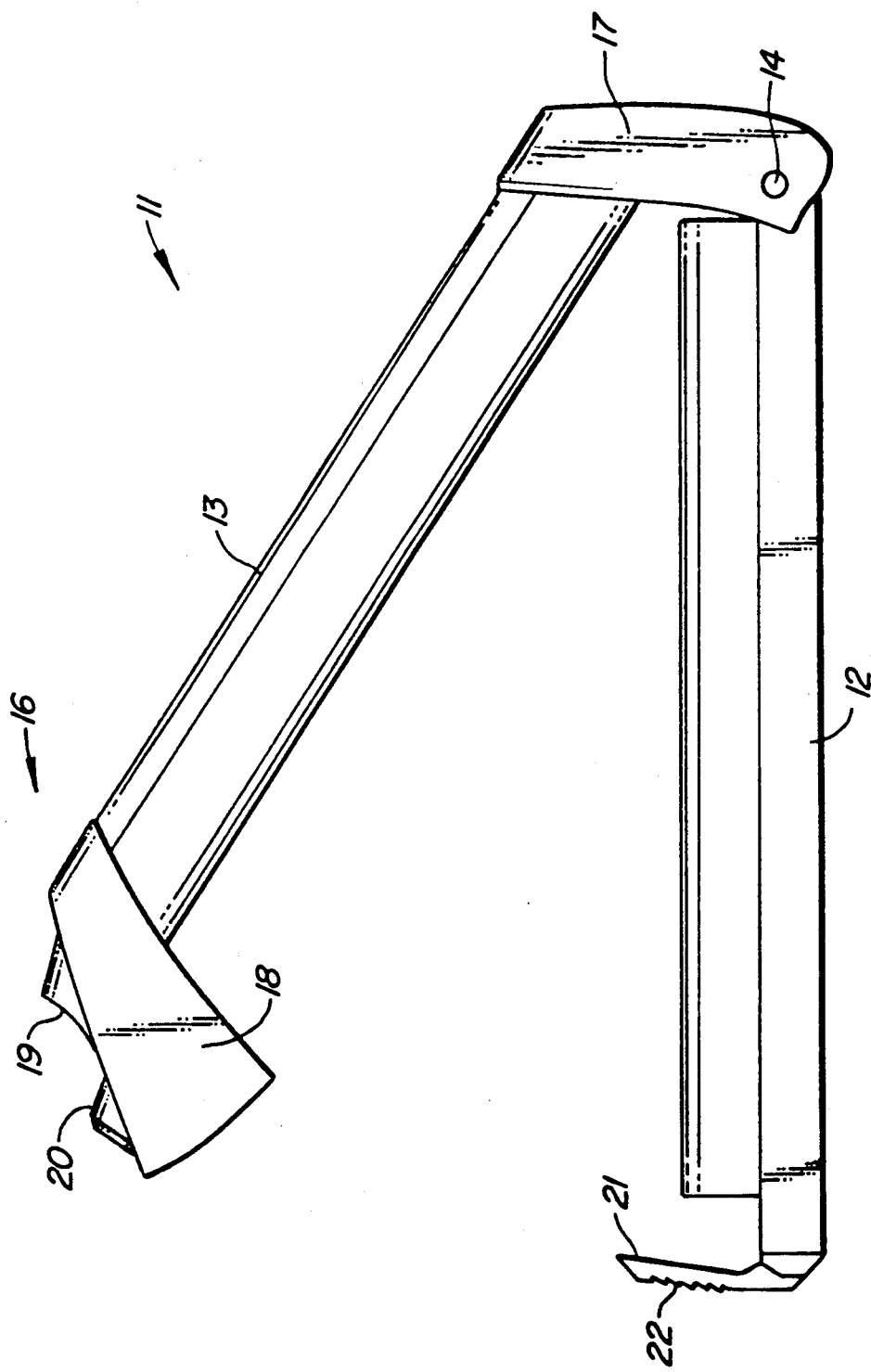
FIG. 1 is a side view of a ski mount in accordance with the present invention.

FIG. 1 depicts a ski mount 11 intended for attachment to a rack affixed to the roof of a vehicle such as a passenger car or recreational vehicle In this view, the ski mount is seen from either the front or rear of the vehicle, and will span the width of the vehicle roof. The skis when mounted in the ski mount will extend perpendicular to the plane of the figure.

The ski mount 11 is shown in an open position, and consists of a lower or stationary bar 12 and an upper or movable bar 13. The lower bar 12 is secured immovably to the roof rack by conventional means such as straps, rings or bolts. The upper bar 13 is attached to the lower bar 12 through a pivoting or hinge-type connection 14 at one end, the other ends of each bar being open ends 15, 16 which are brought together to close the mount over the skis.

The two ends of the upper bar 13 are capped with end caps 17, 18, which in this embodiment are cowl-shaped. Each end cap serves several functions, including covering the end of the upper bar to provide a streamlined appearance, covering also the end of the lower bar when the mount is closed to further enhance the appearance of the mount, concealing and removing from manual access the hinge connection 14 to protect the user from possible injury, and concealing and providing a support for the catch mechanism at the open end 16 of the upper bar, again to protect the user and to protect the mechanism itself from damage resulting from inadvertent contact, as well as a key-operated lock for the catch if desired. Protruding from the end cap 18 at the open end of the bar are a button 19 for manual release of the catch and a raised keyhole 20 for locking the catch in the closed position.

Extending upward from the open end 15 of the lower bar 12 is a harpoon 21 which forms the lower portion of the closure. A row of teeth 22 is cut into one side of the harpoon, the teeth being shaped to be engaged by a rotatable pawl (not visible in this drawing) inside the end cap 18, which forms the upper portion of the closure.

Figure 3:
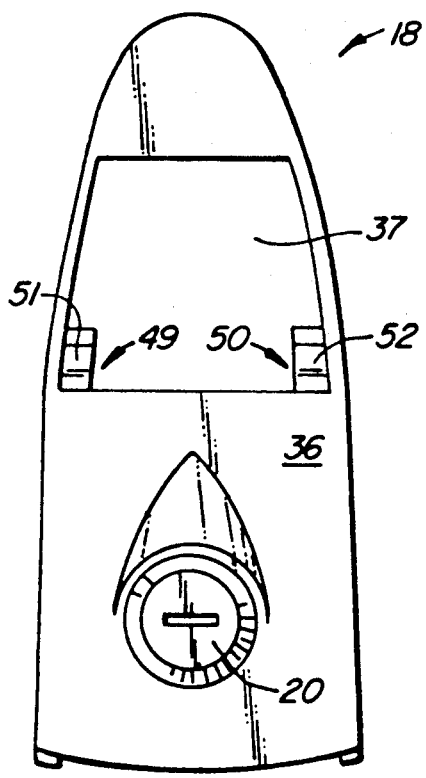
FIG. 3 is an end view of the end cap of FIG. 2.
Figure 4:
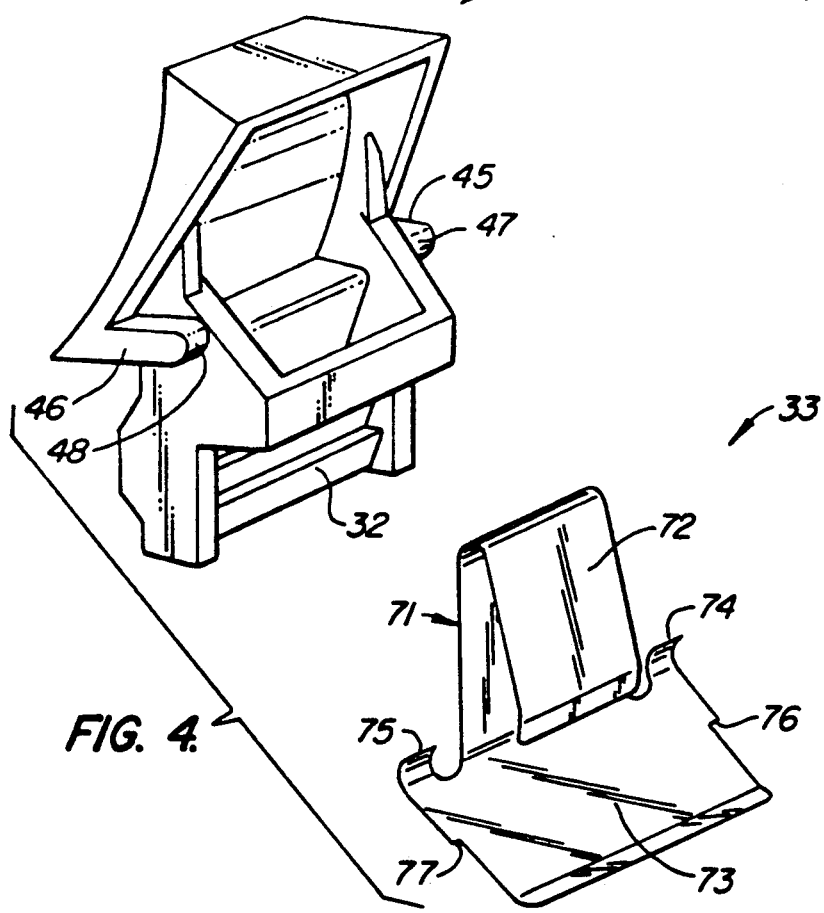
FIG. 4 is a perspective view of the insert and spring clip of FIG. 2.

The structure of the end cap 18 and associated parts are visible in FIGS. 2, 3 and 4. FIG. 2 depicts the end cap 18 in cross section, together with an insert 31 which contains the manually operated button 19 and the pawl 32 referred to above, and a spring clip 33 serving the functions enumerated above. The insert and spring clip are shown disengaged from the end cap in this Figure for purposes of clarity. As FIG. 2 indicates, the end cap 18 is hollow, with side walls 34 (only one of which is shown), a top wall 35 (which is rounded, as shown in FIG. 3) and an end wall 36. The end wall 36 contains an opening 37 to receive the insert 31, and the lower end 38 of the end cap is open to receive both the lower bar 12 and the harpoon 21 (FIG. 1) when the mount is closed. The end wall opening 37 is also visible in the end view shown in FIG. 3.

By comparing the cross section view of FIG. 2 with the perspective view of FIG. 4, it is seen that the insert 31 contains a pair of ribs 45, 46, one on each of the two sides of the insert. The ribs are straight and each terminates in a rounded or semicircular terminus 47, 48. These ribs mate with slots 49, 50 (FIGS. 2 and 3) on the interior of the end cap adjacent to the end wall opening 37. The slots 49, 50 are positioned to permit the ribs 45, 46 to slide into position until the rounded ends 47, 48 of the ribs meet correspondingly rounded sockets 51, 52 at the inside end of each slot.

Each slot is defined by a pair of walls 53, 54, shown in FIG. 2 for slot 49. The walls form an acute angle with each other, and this angle together with the rounded shape of the socket 51 and rounded terminus 47 of the rib permit rotation of the rib in the socket through that angle, and hence rotation of the insert in the end cap through the same angle.

Figure 5:
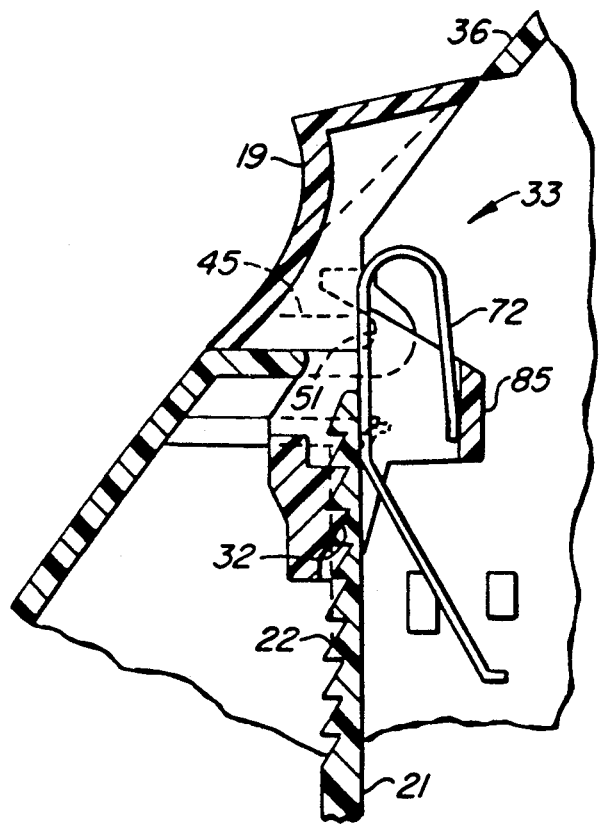
FIG. 5 is an assembled side view of the end cap, insert, and spring clip of FIG. 2, together with the harpoon extending upward from the lower part of the ski mount, with the insert in a position in which the harpoon is engaged.
Figure 6:
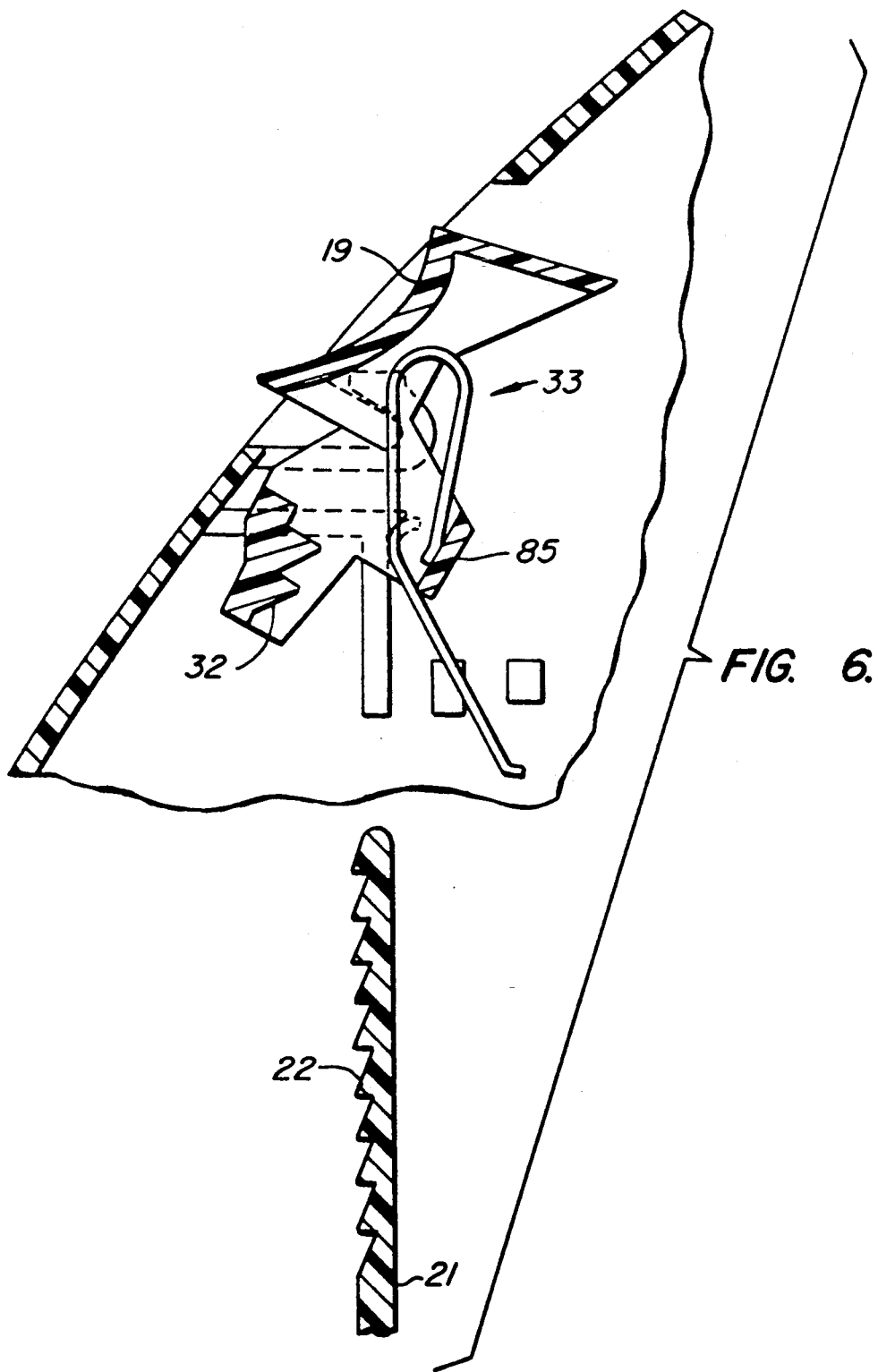
FIG. 6 is an assembled side view similar to that of FIG. 5, with the insert in a position in which the harpoon is released.

The two extreme rotational positions of the rib and end cap are shown in FIGS. 5 and 6. In FIG. 5, the rib is parallel to the lower horizontal wall 53, while in FIG. 6, the rib is rotated parallel to the upper angled wall 54. The position shown in FIG. 5 may be referred to as a "locking position" of the insert since it places the pawl 32 in position to engage the teeth of the harpoon when the harpoon extends upward into the end cap. The position shown in FIG. 6 may be referred to as a "release position" since it rotates the pawl away from the harpoon teeth to release of the harpoon. The spring clip 33 urges the insert toward the locking position of FIG. 5, while pressure of the user's finger on the button 19 urges the insert toward the release position of FIG. 6. The spring clip is distorted when the insert is in the release position, such that when the finger pressure is removed, the spring clip returns the insert to the locking position.

In the construction shown in these Figures, the insert may be rigidly secured in the locking position by a key-operated lock 61 (FIG. 2), which operates by rotation of an L-shaped member 62. The protruding bar 63 of the L when in the position shown in FIG. 2 abuts the rear surface 64 of the pawl 32, preventing the pawl from being rotated back out of engagement with the harpoon teeth despite any pressure applied to the button 19. To disengage the lock 61, the L-shaped member 52 is rotated 180° to place the protruding bar 63 out of alignment with the pawl, restoring the full range of rotation to the insert.

The spring clip 33 is shown in a perspective view in FIG. 4. The top portion of the spring clip is an elongated tongue bent over to form a resilient inverted V consisting of a vertical section 71 and an angled section 72. Below the inverted V is a base section 73 which is wider than the vertical and angled sections 71, 72 of the upper portion. Extending upward from each side of the base section 73 are a pair of curved tabs 74, 75, and the side edges of the base section are notched to form shoulders 76, 77.

The spring clip 33 is held inside both the end cap 18 and the insert 31 by contact points and surfaces which hold the spring clip in place. Referring to FIG. 2, the parts are assembled by inserting the insert 31 through the end wall opening 37 of the end cap, with the ribs 45, 46 of the insert fully engaged with the sockets 51, 52 of the end cap interior. The spring clip 33 is then inserted upward through the open lower end 38 of the end cap, its passage being guided by guide ribs 81, 82 on the interior wall of the end cap. Opposing guide ribs, not visible in FIG. 2, are included on the opposite internal wall of the end cap. The inverted V portion of the spring clip defined by the vertical and angled sections 71, 72 simultaneously enters the interior of the insert through an opening 84 at the bottom of the insert. When the spring clip 33 is fully inserted, the curved tabs 74, 75 of the spring clip are pressed against angled stops 83 extending from one of the guide ribs 81, the angled section 72 of the spring clip is pressed against a crossbar 85 on the insert, and the shoulders 76, 77 are resting on retaining ribs 86. The cross section view of FIG. 2 shows only one angled stop 83 and one retaining rib 86; the opposing wall not shown in the Figure contains an identical but opposing protrusion and rib.

The function and operation of the spring clip are best seen from FIG. 5 which shows the assembled parts. The force which the angled section 72 of the spring clip exerts on the crossbar 85 of the insert urges the insert to the right in the view shown in the drawing, forcing the insert side rib 45 into the socket 51 and thereby holding the insert in place. The force on the crossbar 85 also urges the insert into the rotational position of FIG. 5, thereby holding the pawl 32 and the harpoon teeth 22 in engagement. The base section 73 of the spring clip, which is held at an angle with respect to the direction of insertion of the harpoon 21, serves as a guide for the travel of the harpoon as the harpoon approaches the pawl 32 of the insert. The upper vertical section 71 of the spring clip serves as a backing for the harpoon once the harpoon is inserted, holding the harpoon securely in position for engagement by the pawl and preventing any backward displacement of the harpoon away from the pawl. The only means of disengagement of the harpoon and pawl is therefore release of the pawl by manual pressure on the button.

Preferred embodiments of the ski mount structure include a torsion spring at the hinge end of the mount, i.e., inside the end cap 17 of FIG. 1. The torsion spring, which is not visible in the drawing, may be of conventional construction and configuration. In its relaxed position, the torsion spring holds the upper bar 13 up in the position shown in FIG. 1. Forcing the upper bar down over the lower bar places the torsion spring under tension, and when the harpoon is released from the pawl by manual pressure on the button 19, the torsion spring will return the upper bar to its raised position. Ski mounts are generally used in pairs, arranged parallel, such that a single ski is held down both at the front and back. The torsion spring permits both mounts to be manipulated simultaneously by one person, since only one hand is required for each mount.

The parts shown and/or described herein may be made from conventional materials by conventional means of manufacture. The upper and lower bars, for example, will generally have metallic supports, formed by extrusion or molding, while the contacting surfaces of the bars will generally be of a resilient material such as natural or synthetic rubber or rubber-like plastics, to afford flexibility, pressure and gripping properties. The end caps may be of molded plastic, and the spring clip and torsion spring will be of an appropriately treated metal such as a high-carbon heat-treated steel.

The foregoing is offered primarily for purposes of illustration. It will be readily apparent to those skilled in the art that substitutions, modifications and other types of variations in the sizes, shapes, materials and arrangement of the parts may be made without departing from the spirit and scope of the invention.

What is claimed is:

1. A ski mount with releasable closure, comprising:
   a stationary bar and a movable bar, each having an open end and a hinge end at which said bars are pivotally joined;
   a hollow end cap affixed to said open end of said movable bar, having an end opening with axis substantially parallel to said movable bar and a lower opening facing said stationary bar;
   an insert sized to be received in said end opening, a portion of said insert shaped to form a button which protrudes through said end opening when said insert is so received, said insert further containing a pawl;
   a post protruding from said open end of said stationary bar, said post being positioned to enter said lower opening of said end cap when said open ends of said stationary and movable bars are drawn together, said post having teeth engageable by said pawl;
   mated members on said insert and said end cap positioned to engaged each other and when thus engaged to permit rotation of said insert in said end cap by pressure on said button, between a locking position in which said pawl is engaged with said teeth of said post when said post is received in said cowl, and a release position in which said pawl is clear of said teeth;
   spring means shaped to fit inside said end cap and to engage said end cap, said insert and said post, and in so doing to urge said mated members of said insert and said end cap into engagement, to rotationally urge said insert toward said locking position, and to immobilize said post against lateral displacement away from said pawl.

2. A ski mount with releasable closure in accordance with claim 1 in which said mated members comprise a pair of ribs on opposing sides of said insert and a pair of slots on opposing sides of said end opening to permit sliding insertion of said ribs.

3. A ski mount with releasable closure in accordance with claim 2 in which each said rib terminates in a semicircular terminus, and each said slot terminates in a socket with a contour conforming to that of said rib terminus and permitting rotation of said rib therein.

4. A ski mount with releasable closure in accordance with claim 2 in which each said slot is comprised of two opposing walls forming an acute angle permitting angular rotation of each said rib therebetween.

5. A ski mount with releasable closure in accordance with claim 1 in which said insert contains a crossbar positioned to be engaged by said spring means when said insert and said spring means are positioned inside said end cap, whereby pressure by said spring means against said crossbar forces said mated members of said insert and said end cap into engagement and exerts a rotational force on said insert toward said locking position.

6. A ski mount with releasable closure in accordance with claim 1 in which:
   said mated members comprise:
      a pair of ribs on opposing sides of said insert, each said rib terminating in a semicircular terminus, and
      a pair of slots on opposing sides of said end opening, each said slot defined by two opposing walls forming an acute angle and joined by a curved socket having a curvature approximately equal to that of said semicircular terminus,
   and said insert contains a crossbar positioned to be engaged by said spring means when said insert and said spring means are positioned inside said end cap, whereby pressure by said spring means against said crossbar forces said semicircular termini of said ribs into said curved sockets and forces each said rib against one of said opposing walls of each said slot.

* * * * *